US009280831B1

United States Patent
Harary et al.

(10) Patent No.: US 9,280,831 B1
(45) Date of Patent: Mar. 8, 2016

(54) IMAGE SEGMENTATION

(71) Applicant: International Business Machines Corporation, Armonk, NY (US)

(72) Inventors: Sivan Harary, Haifa (IL); Noel S. Kropf, Garrison, NY (US); Mattias Marder, Haifa (IL); Charles F. Wiecha, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/521,478

(22) Filed: Oct. 23, 2014

(51) Int. Cl.
*G06T 7/00* (2006.01)
*G06K 9/00* (2006.01)
*G06K 9/62* (2006.01)

(52) U.S. Cl.
CPC .......... *G06T 7/0085* (2013.01); *G06K 9/00442* (2013.01); *G06K 9/6202* (2013.01)

(58) Field of Classification Search
CPC .......... G06K 9/00476; G06K 9/00442; G06K 9/6202; G06K 9/00416; G06K 9/00422; G06K 9/0014; G06T 7/0081; G06T 7/0093; G06T 7/0085
See application file for complete search history.

(56) References Cited

U.S. PATENT DOCUMENTS

| 6,081,816 | A | * | 6/2000 | Agrawal | G06F 17/211 715/210 |
| 7,734,995 | B1 | | 6/2010 | Saikaly | |
| 8,571,351 | B2 | * | 10/2013 | Yang | G06K 9/6211 382/294 |
| 2003/0095709 | A1 | * | 5/2003 | Zhou | G06T 7/0083 382/190 |
| 2004/0070586 | A1 | * | 4/2004 | Taubin | G06T 17/205 345/423 |
| 2005/0278625 | A1 | | 12/2005 | Wessling | |
| 2006/0062464 | A1 | * | 3/2006 | Li | G06K 9/222 382/186 |
| 2006/0239506 | A1 | * | 10/2006 | Zhang | G06K 9/00771 382/103 |
| 2009/0070329 | A1 | * | 3/2009 | Ma | G06F 17/30029 |
| 2010/0073402 | A1 | | 3/2010 | Delia | |
| 2011/0035661 | A1 | * | 2/2011 | Balinsky | G06F 17/218 715/243 |
| 2011/0164816 | A1 | * | 7/2011 | Guo | G06K 9/00241 382/165 |

(Continued)

FOREIGN PATENT DOCUMENTS

| EP | 20050106902 | 1/2007 |
| WO | 2008114683 | 9/2008 |

OTHER PUBLICATIONS

Hideaki Uchiyama et al., "Augmenting Text Document by On-Line Learning of Local Arrangement of Keypoints", ISMAR '09 Proceedings of the 2009 8th IEEE International Symposium on Mixed and Augmented Reality, pp. 95-98, ACM.

(Continued)

*Primary Examiner* — Jingge Wu

(57) ABSTRACT

A method comprising using at least one hardware processor for: applying an edge detection algorithm to an image of a document to receive a map of edges from which multiple optional contours of the document in the image are identified; splitting the multiple optional contours into line segments; sorting the line segments into equivalence classes of collinearity representing distinct line segments of the line segments, wherein each one of the classes of collinearity represents a distinct line segment of the distinct line segments; deriving a connectivity graph based on the equivalence classes of collinearity; identifying four vertex polygons in said connectivity graph; evaluating each one of the identified four vertex polygons according to one or more segmentation criterions; and segmenting the document in the image according to the most highly evaluated four vertex polygon of the four vertex polygons.

14 Claims, 1 Drawing Sheet

(56) References Cited

U.S. PATENT DOCUMENTS

| | | | |
|---|---|---|---|
| 2013/0295952 A1* | 11/2013 | Chao | G01S 5/0236 455/456.1 |
| 2014/0099001 A1 | 4/2014 | Nepomniachtchi et al. | |
| 2014/0184595 A1* | 7/2014 | Aho | G06F 17/509 345/420 |
| 2015/0187130 A1* | 7/2015 | Guskov | G06T 17/05 345/420 |

OTHER PUBLICATIONS

Abbyy et al., "Abbyy Mobile Data Capture Solution an exciting new channel for data exchange", Abbyy USA. Can be found at: http://www.newwavetech.com/PDFs/Vendor/ABBYY/ABBYY%20Mobile%20Data%20Capture%20Solution.pdf.

* cited by examiner

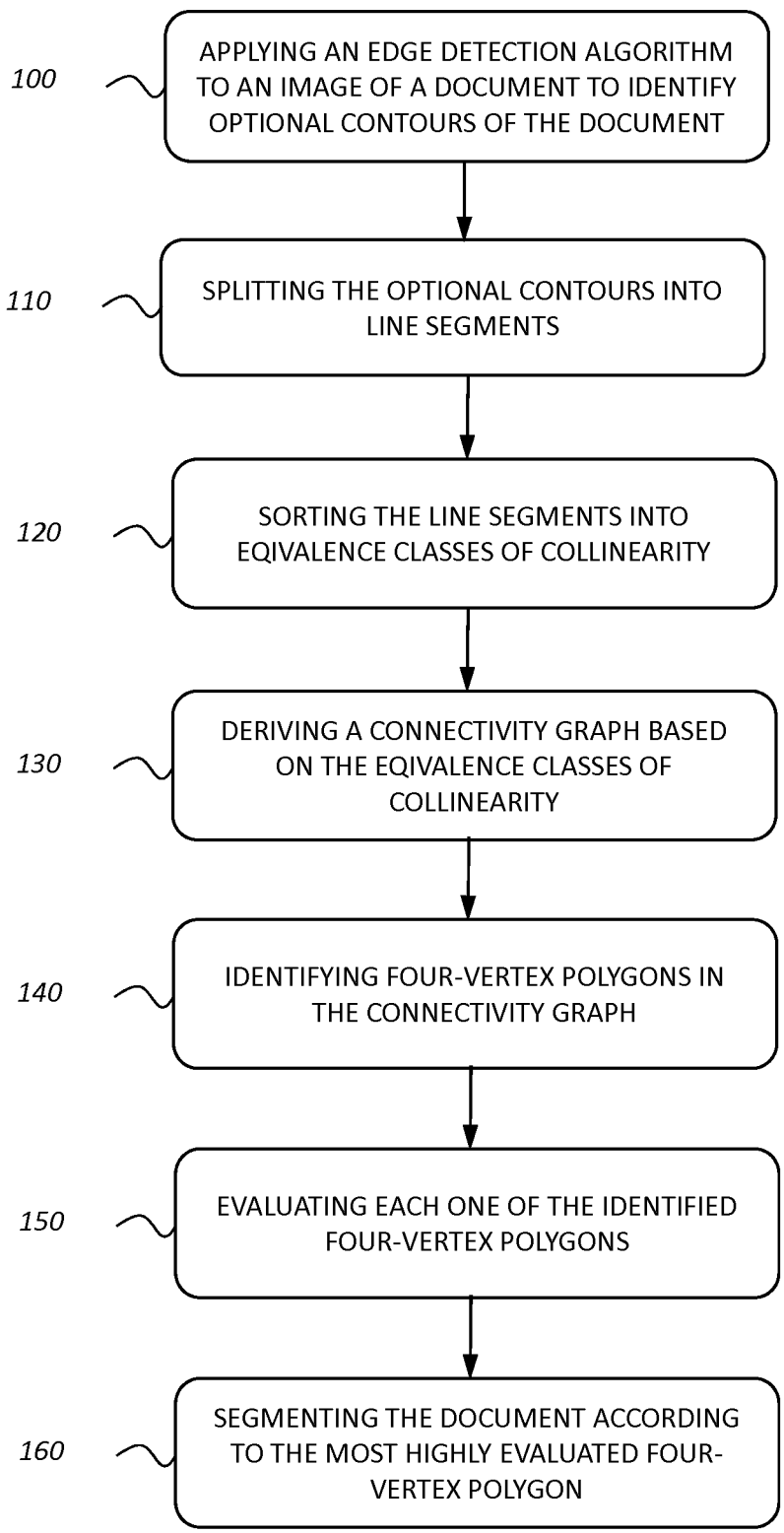

IMAGE SEGMENTATION

BACKGROUND

The present invention relates to the field of digital image processing in general and to image segmentation in particular.

Image segmentation is the process of partitioning a digital image into multiple segments (i.e., sets of pixels). Image segmentation is typically used to locate objects and boundaries (lines, curves, etc.) in images.

There are a variety of potential devices for capturing digital images of documents, including digital cameras, scanners, and cellular phones with built-in digital cameras, for purposes such as storing and/or processing of the document image. Digital images of documents may also be obtained by digitizing an image of a document captured with a conventional film camera. A variety of systems also exist for processing images of documents captured by such devices. For example, it is known to separate the document image in a captured image (i.e., the foreground of the image) from the remainder or surrounding image (i.e., the background of the image) using segmentation.

The foregoing examples of the related art and limitations related therewith are intended to be illustrative and not exclusive. Other limitations of the related art will become apparent to those of skill in the art upon a reading of the specification and a study of the FIGURES.

SUMMARY

The following embodiments and aspects thereof are described and illustrated in conjunction with systems, tools and methods which are meant to be exemplary and illustrative, not limiting in scope.

There is provided, in accordance with an embodiment, a method comprising using at least one hardware processor for: applying an edge detection algorithm to an image of a document, to receive a map of edges from which multiple optional contours of the document in the image are identified; splitting the multiple optional contours into line segments; sorting the line segments into equivalence classes of collinearity representing distinct line segments of the line segments, wherein each one of the classes of collinearity represents a distinct line segment of the distinct line segments; deriving a connectivity graph based on the equivalence classes of collinearity; identifying four-vertex polygons in said connectivity graph; evaluating each one of the identified four-vertex polygons according to one or more segmentation criterions; and segmenting the document in the image according to the most highly evaluated four-vertex polygon of the four-vertex polygons.

There is provided, in accordance with another embodiment, a computer program product comprising a non-transitory computer-readable storage medium having program code embodied therewith, the program code executable by at least one hardware processor to: apply an edge detection algorithm to an image of a document to receive a map of edges from which multiple optional contours of the document in the image are identified; split the multiple optional contours into line segments; sort the line segments into equivalence classes of collinearity representing distinct line segments of the line segments, wherein each one of the classes of collinearity represents a distinct line segment of the distinct line segments; derive a connectivity graph based on the equivalence classes of collinearity; identify four vertex polygons in said connectivity graph; evaluate each one of the identified four vertex polygons according to one or more segmentation criterions; and segment the document in the image according to the most highly evaluated four vertex polygon of the four vertex polygons.

There is provided, in accordance with a further embodiment, a device comprising: a digital camera; at least one hardware processor configured to: obtain an image of a document by said digital camera; apply an edge detection algorithm to the image of the document to receive a map of edges from which multiple optional contours of the document in the image are identified; split the multiple optional contours into line segments; sort the line segments into equivalence classes of collinearity representing distinct line segments of the line segments, wherein each one of the classes of collinearity represents a distinct line segment of the distinct line segments; derive a connectivity graph based on the equivalence classes of collinearity; identify four vertex polygons in said connectivity graph; evaluate each one of the identified four vertex polygons according to one or more segmentation criterions; and segment the document in the image according to the most highly evaluated four vertex polygon of the four vertex polygons.

In some embodiments, the method further comprises using said at least one hardware processor for obtaining said image of the document.

In some embodiments, the method further comprises using said at least one hardware processor for defining a central region in the image of the document; and removing edge pixels of the edge map which are located within the central region.

In some embodiments, the method further comprises using said at least one hardware processor for: dividing the image of the document into patches, wherein one or more of the patches are center patches located at the center of the image of the document; calculating similarity between one or more center patches and the remainder of the patches; removing one or more patches from the image of the document which their similarity to the one or more center patches is below a predefined threshold to form a reduced image of the document; dilating the reduced image of the document to form a masked image of the document; and comparing the map of the edges to the masked image of the document to verify the identified multiple optional contours.

In some embodiments, splitting of the multiple optional contours into line segments is performed by using Heron's formula to identify curvatures of each one of the multiple optional contours.

In some embodiments, said connectivity graph comprises nodes and paths connecting the nodes, and wherein the paths represent the distinct line segments and the nodes represent intersections between the distinct line segments.

In some embodiments, the one or more segmentation criterions are selected from the group consisting of: internal pixel homogeneity, maximum background contrast, pose likelihood and ratio text-like areas.

In some embodiments, the identifying of the four-vertex polygons in said connectivity graph is performed by using Breadth First Search.

In some embodiments, said program code is further executable by said at least one hardware processor to define a central region in the image of the document; and remove edge pixels of the edge map which are located within the central region.

In some embodiments, said program code is further executable by said at least one hardware processor to: divide the image of the document into patches, wherein one or more of the patches are center patches located at the center of the image of the document; calculate similarity between one or more center patches and the remainder of the patches; remove one or more patches from the image of the document which their similarity to the one or more center patches is below a predefined threshold to form a reduced image of the document; dilating the reduced image of the document to form a masked image of the document; and compare the map of the edges to the masked image of the document to verify the identified multiple optional contours.

In some embodiments, said at least one hardware processor is further configured to define a central region in the image of the document; and remove edge pixels of the edge map which are located within the central region.

In some embodiments, said at least one hardware processor is further configured to: divide the image of the document into patches, wherein one or more of the patches are center patches located at the center of the image of the document; calculate similarity between one or more center patches and the remainder of the patches; remove one or more patches from the image of the document which their similarity to the one or more center patches is below a predefined threshold to form a reduced image of the document; dilate the reduced image of the document to form a masked image of the document; and compare the map of the edges to the masked image of the document to verify the identified multiple optional contours.

In addition to the exemplary aspects and embodiments described above, further aspects and embodiments will become apparent by reference to the FIGURES and by study of the following detailed description.

BRIEF DESCRIPTION OF THE FIGURES

Exemplary embodiments are illustrated in referenced FIGURES. Dimensions of components and features shown in the FIGURES are generally chosen for convenience and clarity of presentation and are not necessarily shown to scale. The FIGURES are listed below.

FIG. 1 shows a flowchart of a method, constructed and operative in accordance with an embodiment of the disclosed technique.

DETAILED DESCRIPTION

Disclosed herein is an image segmentation method, which may provide a robust solution for segmenting images of documents, captured in very cluttered environments.

Although segmentation processes, including the disclosed one, may be applicable to both camera and scanner-captured images, it tends to be easier to separate the imaged document from the background of the image in scanner-captured images than camera-captured images. This is since the conditions under which the image is captured tend to vary more and be less optimal when using a camera than a scanner, for example, due to shadows, poor lighting, indistinct background and/or the like. Thus, the disclosed image segmentation may be more useful when applied to camera captured images and mobile camera captured images, in particular. The disclosed image segmentation may be used, for example, for the purpose of automatically defining templates for mobile document processing, when accurate alignment of filled-in, mobile-captured documents is required.

The term "document", as referred to herein, may relate to information printed or sketched on tangible material such as a paper or a board, at least partially in a form of text. However, it is intended herein explicitly that the term "document" may cover also non-textual information printed or sketched on tangible material, such as pictures and drawings.

Reference is now made to FIG. 1, which shows a flowchart of a method, constructed and operative in accordance with an embodiment of the disclosed technique. In a step 100, an edge detection algorithm may be applied to an image of a document (or simply "the image") to receive a map of edges. Multiple optional contours of the document in the image may be then identified in the map of edges, for example, by following the gradients of the image. The width of the optional contours in the image may be of one pixel. The optional contours may be continuous and may be complete or partial contours of the document in the image. One or more edge detection algorithms may be used, as known in the art, such as the Canny edge detector. In some embodiments, one may use machine learning techniques to train a classifier dedicated to such edge detection. For example, one may use multiresolution approaches for edge detection and classification based on discrete wavelet transform: Guillermo Palacios, J. Ramón Beltrán and Raquel Lacuesta (2011). "Multiresolution Approaches for Edge Detection and Classification Based on Discrete Wavelet Transform, Discrete Wavelet Transforms—Algorithms and Applications", Prof. Hannu Olkkonen (Ed.), ISBN: 978-953-307-482-5, InTech, DOI: 10.5772/19506. *Intech*. Web. 20 Oct. 2014. <http://www.intechopen.com/books/discrete-wavelet-transforms-algorithms-and-applications/multiresolution-approaches-for-edge-detection-and-classification-based-on-discrete-wavelet-transform>.

In some embodiments, a central region may be defined in the image. Edge pixels of the edge map which are located within the central region may be then removed. The central region may be a region located in the center of the image. Since it is very likely that the document is located in the center of the image, one may assume that the central region is located in the center of the document. Thus, edge pixels located in the center of the document may be irrelevant to the purpose of edge detection and therefore their removal may optimize the process of edge detection without reducing or substantially reducing its accuracy.

In some embodiments, the method may include the optional step of obtaining the image of the document, for example by using a digital camera to capture an image of the document. In other embodiments the image of the document may be received, for example, as a user input.

In some embodiments, the method may include additional optional steps of initial processing of the image of the document, to be performed prior to step 100. An example for such initial processing is described herein below. Such initial processing may make the segmentation process more efficient in terms of computational resources consumption. In an optional step, pre-processing of the image of the document may be performed for the purpose of blurring and/or noise reduction. Various known algorithms may be used for this purpose such as a low-pass filter, a Gaussian filter and/or a median filter.

In another optional step, the image of the document may be divided into patches. The size of the patches may be predefined with respect to the size of the image. The patches may be quadrangular. The patches size may be such to provide image resolution that facilitates an efficient initial processing, as described herein below. For example, the patches may be square having a size predefined to be around 10% of the image width in pixels. One or more of the patches may be center patches, i.e., located at the center of the image of the document. One may assume that the center patches are located within the document in the image since the document is the subject of the image.

In a further optional step, similarity between the one or more center patches and the remainder of the patches may be calculated. The similarity between the patches may be calculated, for example, by using the matchTemplate function of the Open Source Computer Vision Library (Object Detection matchTemplate. *OpenCV*. Web. 20 Oct. 2014. <http://docs.opencv.org/modules/imgproc/doc/object_detection.html?highlight=matchtemplate#matchtemplate>). One or more center patches may be correlated with the remainder of the patches and a similarity score may be assigned to each of the remaining patches (i.e., the patches which are not center patches).

In another optional step, one or more patches, which their similarity to the one or more center patches (i.e., the similarity score) is below a predefined threshold, may be removed from the image of the document. A reduced image of the document is then formed. Since the center patches are assumed to be located within the document, patches which belong to the background of the image of the document (i.e., surrounding the document) may be assigned with the lowest similarity score and therefore may be removed. Patches which are located within the image may be assigned with the highest similarity score and therefore may not be removed. Patches which are located on the edges of the document (i.e., having a portion located within the document and a portion located outside of the document, i.e., in the background) may be assigned with similarity score there between and therefore may or may not be removed from the image. Thus, a reduced image derived from the image of the document may be received which may include a reduced document.

In a further optional step, the reduced image of the document may be dilated to form a masked image of the document. In some embodiments, a morphological dilation may be applied, e.g., a binary morphological dilation, to gradually enlarge the boundaries of regions of foreground pixels (i.e., pixels belonging to the document). In some other embodiments, a radial dilation may be applied. For example, if the distance between a center pixel (i.e., a pixel located at the center of the document) and an edge pixel (i.e., a pixel located on the edge of the document) is denoted "D", than the edge pixel may be radially expanded so that its distance from the center pixel would be $c*D$, where "c" is a predefined parameter, e.g., c=1.1.

In another optional step, the map of edges may be compared to the masked image of the document to verify the identified multiple optional contours. The information provided by the map of edges with respect to optional contours of the document in the image may be cross-checked with the masked image.

Alternative or additional methods which may provide an initial processing of the image of the document, as known in the art, may be used.

In a step 110, the multiple optional contours may be split into line segments. Since a contour of a document is generally rectangular, i.e., including four substantially perpendicular line segments, splitting of the optional contour into such line segments may be desired. In some embodiments, each one of the multiple optional contours may be split into one or more line segments based on its curvatures. A curvature in an optional contour may indicate of an end of a line segment and a beginning of a new, unparallel one. Thus, identifying curvatures in the optional contours may enable the splitting of the contours. The curvatures of each one of the multiple optional contours may be identified based on Heron's formula. By using Heron's formula, one may receive the measure of curvature at each point of an optional contour. A threshold may be predetermined for the measure of curvature such that if the measure of curvature is above the threshold then it may be determined as a curvature. In some embodiments, one may use machine learning techniques to identify corners, such as the above indicated multiresolution approaches for edge detection and classification based on discrete wavelet transform. In some other embodiments, one may use RANdom SAmple Consensus (RANSAC) to fit one or more lines to each optional contour to identify such line segments.

In a step 120, the line segments may be sorted into equivalence classes of collinearity. The equivalence classes of collinearity may represent distinct line segments. Multiple line segments may in fact refer to the same line segment. Thus, line segments lying on a single line may be identified and sorted into the same collinearity class based on their collinearity equivalence. Each collinearity class may then represent a distinct line segment. One may use various known techniques in order to sort the line segments into equivalence classes of collinearity (e.g., Loren on the Art of MATLAB. "Collinearity" *MATLAB Central*. The MathWorks, Inc. Web. 20 Oct. 2014. <http://blogs.mathworks.com/loren/2008/06/06/collinearity/>; Scher A. et al (1982) Clustering of Collinear Line Segments, *Pattern Recognition*, Vol. 15, No. 2, 85).

In a step 130, a connectivity graph may be derived based on the equivalence classes of collinearity. The connectivity graph may include nodes and paths connecting the nodes. The paths may represent the distinct line segments represented by the classes of collinearity and the nodes may represent intersections between the distinct line segments. Only intersections forming angles around 90 degrees between distinct line segments may be considered. For example, one may consider intersections which form angles between 70-110 degrees.

In some embodiments, a central region, located in the center of the image, may be defined in the image. Paths connecting nodes which are located within the central region may be then removed. Such paths represent distinct line segments which intersect within the central region. It is very likely that such line segments do not indicate an edge of the document. Thus an optimized connectivity graph may be achieved.

In a step 140, four vertex polygons may be identified in the connectivity graph. The four vertex polygons may be identified by using graph traversal techniques such as Breadth First search or Depth First Search. The connectivity graph may be searched, step by step i.e., from node to node, according to the principles of the specific algorithm which is used. The aim is to identify four vertex polygons, i.e., quadrangular closed loops, starting and ending at the same node within four steps. Thus, each node may be considered as a root node.

In a step 150, each one of the identified four vertex polygons may be evaluated according to one or more segmentation criteria. The segmentation criteria may include: internal pixel homogeneity, maximum background contrast, pose likelihood and ratio text-like areas. Internal pixel homogeneity may indicate of the color homogeneity of internal pixels, i.e., located along the sides of the four vertex polygon and slightly within. For example, an edge of a document may be generally characterized as homogeneous. One may expect an edge of a document to not include, for example, text. In some embodiments the pixel homogeneity may relate to features other than color, such as texture. Maximum background contrast may indicate of the contrast along all of the sides of the polygon (i.e., contrast between the inside (foreground) and the outside (background) of the polygon). The contrast along all of the sides of the polygon may be summed or averaged. A polygon showing the maximal contrast may be a good candidate for segmentation. For example, a polygon which intersects the document may show a poor contrast at least in one side. Pose likelihood may provide measure for the likelihood of the pose of the document in the image. The pose of the document may refer to characteristics such as the relative size of the document with respect to the image and the homography between the plane of the document and the plane of the camera used to capture the document. For example, a four vertex polygon defining a document which is relatively small with respect to the image may have low pose likelihood since it is not likely that a document, which is the subject of an image, would occupy a relatively small portion of the image. Ratio text-like areas may indicate of the relative amount of text (or text-like) included in the different areas of the image with respect to the image, while a document may be characterized as an area which may include the maximal amount of text.

Each four-vertex polygon may be assigned with a score for each segmentation criterion. The scores may be integrated to a segmentation score. In some embodiments, each criterion may be assigned with a relative weight, where the weights may reflect the criterions importance and/or confidence level etc. The segmentation score may be then calculated for each four vertex polygon according to these weights.

In a step 160, the document in the image may be segmented according to the most highly evaluated four vertex polygon of the four vertex polygons. High evaluation in this context may refer to the highest or lowest score (e.g., when assigning segmentation scores), which is best for the purpose of segmentation.

A device providing image segmentation according to the method of FIG. 1 is further disclosed. The device may include a digital camera and at least one hardware processor configured to execute the method of FIG. 1 and, to this end, be in communication with the digital camera and receive imagery data therefrom. The digital camera may be used to capture an image of a document. Such a device may be, for example, a smartphone.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGURES illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising using at least one hardware processor for:
    applying an edge detection algorithm to an image of a document, to receive a map of edges from which multiple optional contours of the document in the image are identified;
    splitting the multiple optional contours into line segments;
    sorting the line segments into equivalence classes of collinearity representing distinct line segments of the line segments, wherein each one of the classes of collinearity represents a distinct line segment of the distinct line segments;
    deriving a connectivity graph based on the equivalence classes of collinearity;
    defining a central region in the image of the document;
    removing edge pixels of the edge map which are located within the central region;
    identifying four-vertex polygons in said connectivity graph;
    evaluating each one of the identified four-vertex polygons according to one or more segmentation criterions; and
    segmenting the document in the image according to the most highly evaluated four-vertex polygon of the four-vertex polygons.

2. The method according to claim 1, further comprising using said at least one hardware processor for obtaining said image of the document.

3. The method according to claim 1, wherein the splitting of the multiple optional contours into line segments is performed by using Heron's formula to identify curvatures of each one of the multiple optional contours.

4. The method according to claim 1, wherein said connectivity graph comprises nodes and paths connecting the nodes, and wherein the paths represent the distinct line segments and the nodes represent intersections between the distinct line segments.

5. The method according to claim 1, wherein the one or more segmentation criterions are selected from the group consisting of: internal pixel homogeneity, maximum background contrast, pose likelihood and ratio text-like areas.

6. The method according to claim 1, wherein the identifying of the four-vertex polygons in said connectivity graph is performed by using Breadth First Search.

7. A computer program product comprising a non-transitory computer-readable storage medium having program code embodied therewith, the program code executable by at least one hardware processor to:
    apply an edge detection algorithm to an image of a document to receive a map of edges from which multiple optional contours of the document in the image are identified;
    split the multiple optional contours into line segments;
    sort the line segments into equivalence classes of collinearity representing distinct line segments of the line segments, wherein each one of the classes of collinearity represents a distinct line segment of the distinct line segments;
    derive a connectivity graph based on the equivalence classes of collinearity;
    define a central region in the image of the document;
    remove edge pixels of the edge map which are located within the central region;
    identify four vertex polygons in said connectivity graph;
    evaluate each one of the identified four vertex polygons according to one or more segmentation criterions; and
    segment the document in the image according to the most highly evaluated four vertex polygon of the four vertex polygons.

8. The computer program product according to claim 7, wherein the splitting of the multiple optional contours into line segments is performed by using Heron's formula to identify curvatures of each one of the multiple optional contours.

9. The computer program product according to claim 7, wherein said connectivity graph comprises nodes and paths connecting the nodes, and wherein the paths represent the distinct line segments and the nodes represent intersections between the distinct line segments.

10. The computer program product according to claim 7, wherein the one or more segmentation criterions are selected from the group consisting of: internal pixel homogeneity, maximum background contrast, pose likelihood and ratio text-like areas.

11. A device comprising:
    a digital camera;
    at least one hardware processor configured to:
        obtain an image of a document by said digital camera;
        apply an edge detection algorithm to the image of the document to receive a map of edges from which multiple optional contours of the document in the image are identified;
        split the multiple optional contours into line segments;
        sort the line segments into equivalence classes of collinearity representing distinct line segments of the line segments, wherein each one of the classes of collinearity represents a distinct line segment of the distinct line segments;

derive a connectivity graph based on the equivalence classes of collinearity;
define a central region in the image of the document;
remove edge pixels of the edge map which are located within the central region;
identify four vertex polygons in said connectivity graph;
evaluate each one of the identified four vertex polygons according to one or more segmentation criterions; and
segment the document in the image according to the most highly evaluated four vertex polygon of the four vertex polygons.

12. The device according to claim 11, wherein the splitting of the multiple optional contours into line segments is performed by using Heron's formula to identify curvatures of each one of the multiple optional contours.

13. The device according to claim 11, wherein said connectivity graph comprises nodes and paths connecting the nodes, and wherein the paths represent the distinct line segments and the nodes represent intersections between the distinct line segments.

14. The device according to claim 11, wherein the one or more segmentation criterions are selected from the group consisting of: internal pixel homogeneity, maximum background contrast, pose likelihood and ratio text-like areas.

* * * * *